3,427,333
PROPARGYL 2-BROMODECANOATE

Raiford L. Holmes and Jerry P. Moreau, New Orleans, and Arthur F. Novak, Baton Rouge, La., assignors to the United States of America as represented by the Secretary of Agriculture
No Drawing. Original application Dec. 19, 1963, Ser. No. 331,977, now Patent No. 3,294,794, dated Dec. 27, 1966. Divided and this application July 6, 1966, Ser. No. 574,858
U.S. Cl. 260—408      1 Claim
Int. Cl. C07c 69/24; A61l 13/00

ABSTRACT OF THE DISCLOSURE

This invention relates to the ester of propargyl alcohol and 2-bromodecanoic acid. This compound is characterized by the fact that as a growth inhibitor it is effective against a variety of pathogenic molds.

---

A non-exclusive, irrevocable, royalty-free license in the invention herein described, throughout the world for all purposes of the United States Government, with the power to grant sublicenses for such purposes, is hereby granted to the Government of the United States of America.

This application is a division of application bearing Ser. No. 331,977, filed Dec. 19, 1963, now U.S. Patent No. 3,294,794.

The compound which is the subject of this invention is:

Propargyl 2-bromodecanoate $$CH_3(CH_2)_7CHBrCOOCH_2C{\equiv}CH$$

This new compound was prepared by conventional methods, and the bioactivity was established by us in vitro, however, as will be obvious to those skilled in the art pertaining to the growth inhibition of molds, the compounds, besides being used as such, can for utilitarian purposes be formulated using a liquid, viscous, or solid diluent.

The diluent or extender must be inert with respect to the compound involved, and since this is the only significant requirement a wide variety of these agents is operable, among which are petroleum jellies, various alcohols and polyols, and vegetable oils.

In the case of intended use as a fungicide in the protective coating composition art the compound, subject of this invention, is compatible with conventional alkyds and with drying oil modified alkyds.

A specific example showing the preparation of the new compound being claimed is presented below along with tabulated data, which is submitted to establish the growth inhibiting properties of the claimed compound.

The compound was screened for its antimicrobial activity again six pathogenic molds—*Candida wernecki, Keratinomyces ajelloi, Microsporum gypseum, Microsporm nanum, Trichophyton rubrum, Trichophyton tonsurans,* as illustrated in Table I.

Streaked and poured agar plates (Difco Dehydrated Mycological Agar at pH 7.0) were used to measure the antimycotic activity against the molds. The streaked agar plates were prepared by streaking the hardened agar plates with the test mold, and the poured agar plates were prepared by pouring dilutions of mold spores over the hardened agar plates. The compound was then added onto specified areas of these poured and streaked agar plates. Both the paper disc method and the addition of small quantities of the pure compound to the surface of the agar plates were used to evaluate the compound.

To eliminate any error which could result from an insufficient number of tests, a minimum of three experiments employing duplicate plates was used for measuring the antimicrobial activity of the compound.

All test plates were incubated at the optimum growing temperature for each organism. The tabulated results which are illustrated in Table I were compiled from periodic readings obtained after incubation of 3, 5, and 7 days. Zones of inhibition were compared with those of the controls.

TABLE I.—THE ANTIMICROBIAL ACTIVITY OF PROPARGYL 2-BROMODECANOATE.

| Compound | Antimicrobial Activity,[1] Microorganisms[2] | | | | | |
|---|---|---|---|---|---|---|
|  | A | B | C | D | E | F |
| Propargyl 2-bromodecanoate | + | ++ | ++ | ++ | + | + |

[1] ++=Good; +=Fair.
[2] A=*Microsporum gypseum.*
B=*Trichophyton rubrum.*
C=*Trichophyton tonsurans.*
D=*Microsporum nanum.*
E=*Keratinomyces ajelloi.*
F=*Candida wernecki.*

The following example illustrates the preparation of the compound of the invention:

2-bromodecanoyl bromide was prepared from decanoic acid and bromine using phosphorus as a catalyst. It was then purified by distillation. 25 grams (0.08 mole) of 2-bromodecanoyl bromide were heated at reflux for 4 hours with 41.2 grams (0.74 mole) of propargyl alcohol. The alcohol was distilled off to yield 19.1 grams crude ester. The ester was distilled under reduced pressure to give 15.7 grams propargyl 2-bromodecanoate; boiling point 113–115 at 1 mm. The bromine content was 28.0% (theoretical 27.6%).

We claim:
1. Propargyl 2-bromodecanoate.

References Cited

UNITED STATES PATENTS 3,294,794   12/1966   Holmes et al. _____ 260—408

OTHER REFERENCES

Poidevin, Chem. Abstracts, vol. 64 (1966), col. 2649.

ALEX MAZEL, *Primary Examiner.*

R. J. GALLAGHER, *Assistant Examiner.*

U.S. Cl. X.R.

260—999